Feb. 28, 1956  H. M. CRANE  2,736,570
INDEPENDENT SPRING SUSPENSIONS FOR DIRIGIBLE WHEELS
Filed Oct. 28, 1952  3 Sheets—Sheet 1

INVENTOR
Henry M. Crane
BY
Willits, Helmig & Baillio
ATTORNEYS

Feb. 28, 1956    H. M. CRANE    2,736,570
INDEPENDENT SPRING SUSPENSIONS FOR DIRIGIBLE WHEELS
Filed Oct. 28, 1952    3 Sheets-Sheet 2
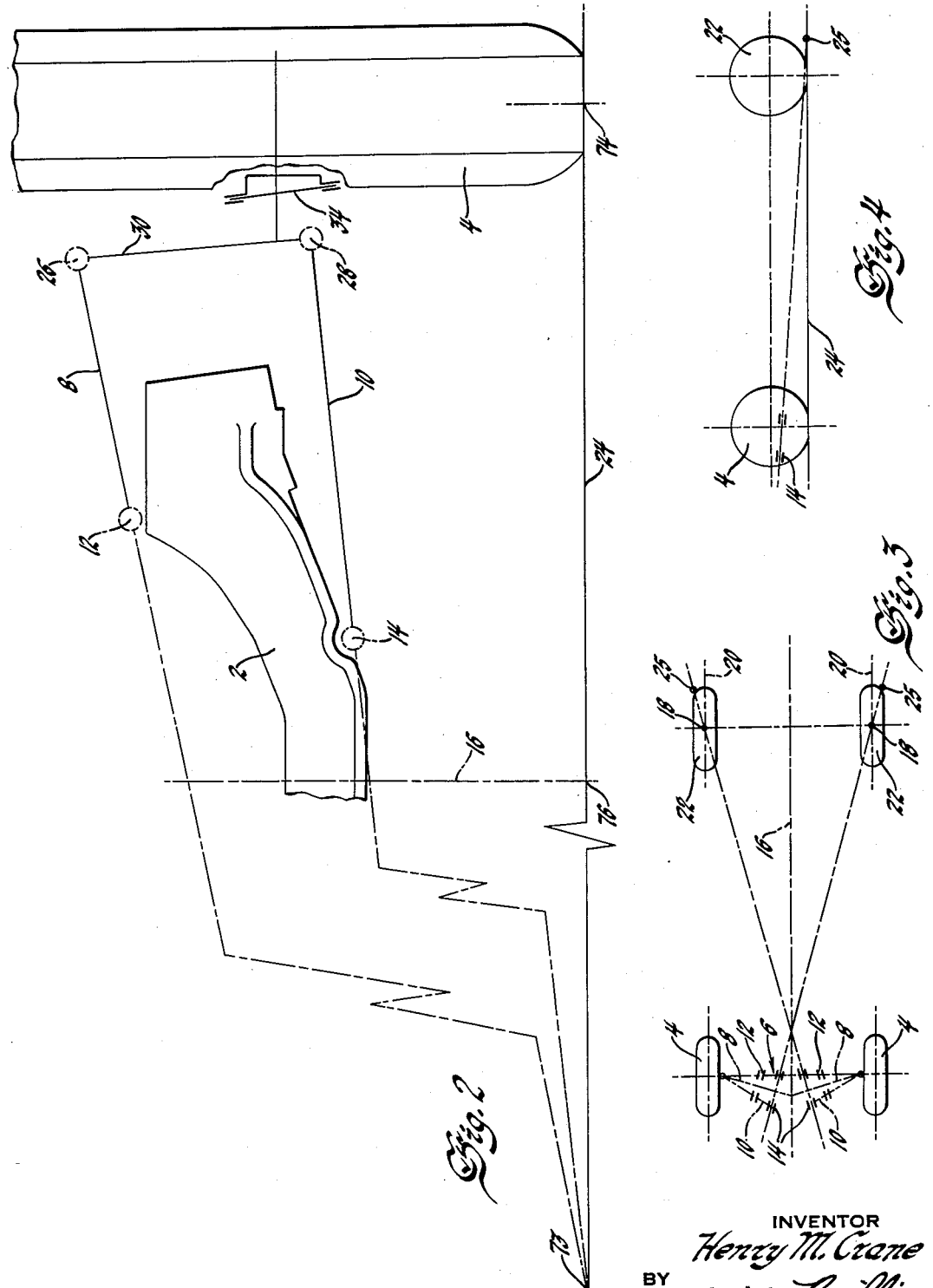
INVENTOR
*Henry M. Crane*
BY
*Willits, Helmig & Caillio*
ATTORNEYS

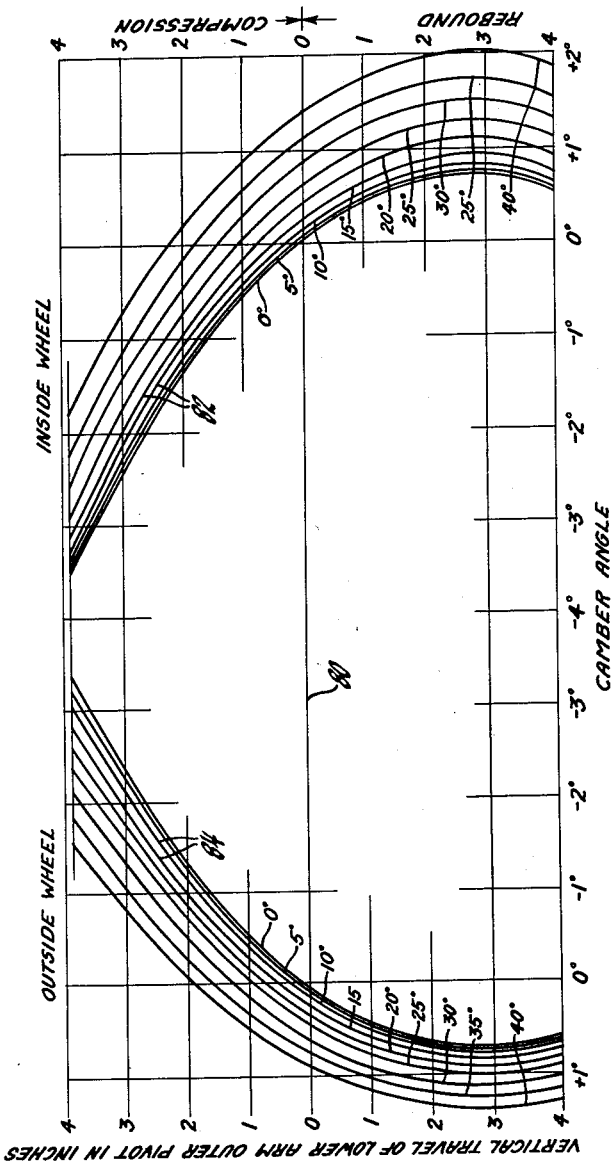
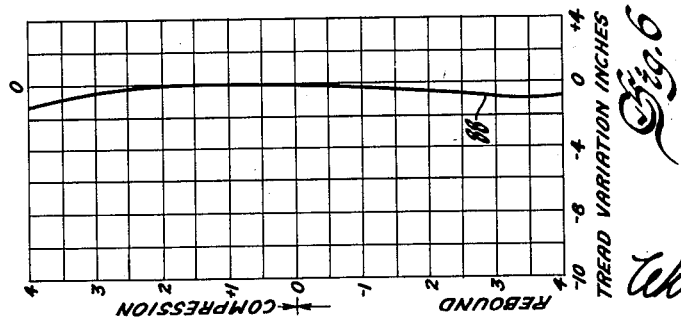

United States Patent Office 2,736,570
Patented Feb. 28, 1956

2,736,570

INDEPENDENT SPRING SUSPENSIONS FOR DIRIGIBLE WHEELS

Henry M. Crane, New York, N. Y., assignor to General Motors Corporation, Detroit, Mich., a corporation of Delaware Application October 28, 1952, Serial No. 317,327

5 Claims. (Cl. 280—96.2)

This invention relates to independent suspensions for vehicles and more particularly to independent suspensions adapted to modify the roll camber of the associated wheels.

Efforts are constantly being made to improve the ride qualities of motor vehicles as well as handling thereof. When traversing bumpy roads or negotiating curves many forces are produced which tend to interfere with proper operation of the vehicle. For example, when a vehicle is negotiating a curve both the inside and outside wheels thereof lean toward the outer side of the curve. This leaning of the wheels is known as roll camber. A camber thrust is thus produced and in order to hold the vehicle in the curve an additional turn on the steering wheel is required to produce an equal amount of slip angle thrust in the opposite direction. An increase in the slip angle results in tire wear and tire squeal. Excessive camber thrust on the other hand slows down the vehicle in a transition. Camber thrust also reduces the maximum cornering force of the tire and therefore detracts from the ability to handle a curve at a given speed. Camber changes also set up gyroscopic couples which cause wheelfight.

In independent suspensions, particularly those for the front wheels of a vehicle, camber changes may be produced by the geometry of the linkage thereof and also by the roll of the entire vehicle when traveling in a curve. While prior attempts have been made to devise independent suspensions which tend to modify roll camber they have not proven to be entirely satisfactory because other undesirable conditions were created or enhanced, such as excessive tire tread variation, wheelfight and poorer handling.

One object of the present invention is to provide an independent suspension which is capable of beneficially modifying the roll camber of a vehicle without materially producing or enhancing other of the above referred to undesirable conditions.

Another object is to provide an independent suspension which improves steering and handling of a vehicle on curves as well as reduces tire wear by reducing roll camber and camber thrust and reducing the slippage angle to the tires.

A further object is to provide an independent wheel suspension having a relatively short swing arm and which is so designed that the instantaneous roll center of the associated vehicle when subjected to a normal predetermined load lies substantially on the road surface supporting the wheels.

A further object is to so arrange the control linkage in suspensions of the stated character as to produce a trailing effect on the associated wheels to generally improve the ride qualities of the vehicle.

A more specific object is to provide an independent suspension of the stated character wherein both the upper and lower links thereof extend upwardly and outwardly from their pivotal connection with the frame, the upper link inclining at a greater angle than the lower link and the point of convergence of said links at a normal predetermined load lying substantially on the road pavement in the vicinity of the opposite side of the vehicle.

Other and further objects will become apparent as the description of the invention progresses.

Of the drawings:

Fig. 2 is a diagrammatic view of the suspension shown in Fig. 1 illustrating the point of convergence of the control arms thereof at a normal predetermined load on the vehicle.

Fig. 3 is a diagrammatic plan view showing the general arrangement of the lower control arms with respect to the associated front wheels of a vehicle.

Fig. 4 is a diagrammatic side elevational view showing the inclination of the pivotal connection of the lower control arm on the vehicle frame.

Fig. 5 is a chart showing the change in camber angle of both the inside and outside front wheels of a vehicle between maximum compression and rebound for steering angles ranging from zero degrees to 40 degrees, and Fig. 6 is a chart showing the tread variation of a wheel during movement thereof from maximum compression to maximum rebound.

Figure 1:
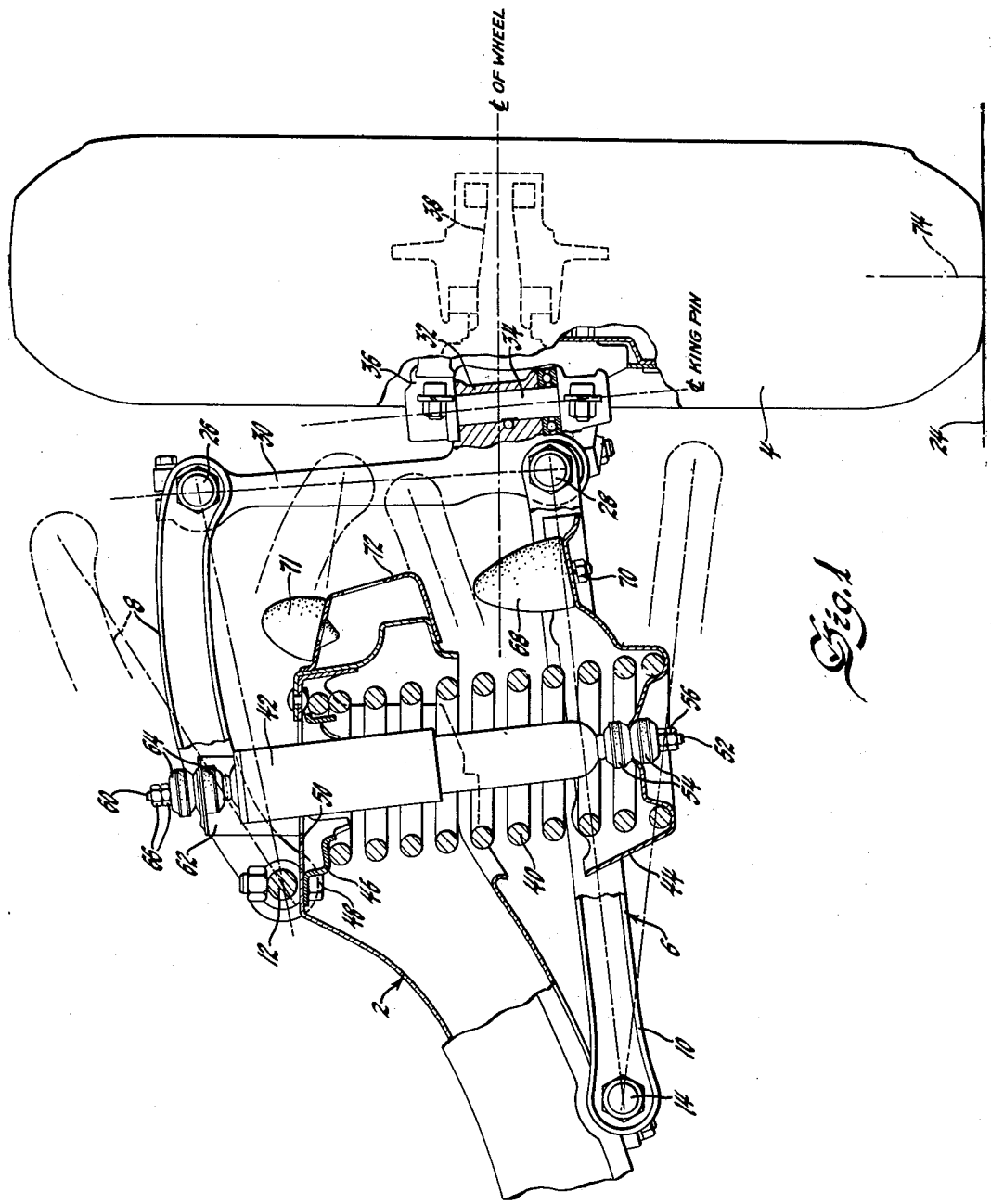
Fig. 1 is a side elevational view, partly in section, of the independent suspension comprising the present invention, certain parts being broken away to show more clearly certain features thereof.

Referring to the drawings, the numeral 2 indicates generally the frame of an automotive vehicle, 4 one of the front wheels, and 6 the independent suspension generally which operatively connects the wheel to the frame. Suspension 6 comprises upper and lower wishbone control links or arms 8 and 10 of usual construction mounted on pivotal supports 12 and 14, respectively, bolted or otherwise secured to frame 2. Pivotal supports 12 and 14 incline inwardly toward the longitudinal center line 16 of the vehicle, as shown in Fig. 3, and downwardly and rearwardly, as shown in Fig. 4. The control arms 8 and 10, accordingly, also incline inwardly and rearward from their pivotal connection with the frame, as shown more clearly in Fig. 3. The axis of the pivotal supports 14 for the front wheels of the vehicle intersect on the center line 16 of the vehicle and pass through points 18 disposed on the center lines 20 of the rear wheels 22 of the vehicle, and at a predetermined normal load on the vehicle engage the pavement 24 at points 25 disposed at the outer sides and near the rearwardly disposed ends of rear wheels 22. The outer ends of wishbone arms 8 and 10 are connected by pivotal connections 26 and 28, respectively, with the upper and lower ends of a steering knuckle support 30. Knuckle support 30 is provided with the usual outwardly extending projecting part 32 having a bore therein which receives the king pin 34. The usual steering knuckle 36 having a wheel spindle 38 integral therewith is pivotally mounted on king pin 34. King pin 34, as shown in Fig. 1, inclines upwardly from a vertical plane at an angle of substantially 5 degrees. Suspension 6 also comprises a spring 40 and a shock absorber 42 disposed in substantially concentric relation. The lower end of spring 40 engages and is held in position by a mounting plate 44 secured by bolts or other suitable fastening means to lower wishbone arm 10. The upper end of spring 40 engages a spring seat 46 secured by bolts 48 to the upper web 50 of frame 2. The lower mounting bolt 52 of shock absorber 42 extends through an opening disposed substantially centrally of mounting plate 44 and is resiliently supported by a pair of grommets 54 secured in position by nuts 56. The upper end of shock absorber 42 extends through an opening provided in the web 50 of frame 2 and the upper mounting bolt 60 thereof extends through an opening provided in a mounting bracket 62 secured in any suitable fashion to the upper surface of the web 50 of frame 2. Grommets 64 are disposed on opposite sides of the bracket 62, and nuts 66 when tightened effectively retain the parts in proper position, as shown in Fig. 1.

A resilient bumper 68 of usual construction is secured by bolt 70 to mounting plate 44 and is adapted to engage an abutment on the frame, not shown, when control arm 10 nears its upper limit of movement, shown by broken lines in Fig. 1. A second resilient bumper 71 is secured at the upper end of an extension of bracket 72 secured by welding or other suitable means to frame 2. Bumper 71 is adapted to engage an abutment plate on arm 8 when the latter moves substantially to its downward limit of movement, as shown by broken lines in Fig. 1. It is apparent that as wheel 4 rolls over a rough or bumpy roadway it is permitted to move upwardly or downwardly by the control arms 8 and 10 to the extent indicated by broken lines in Fig. 1. When the vehicle is negotiating a curve the suspension arms 8 and 10 associated with the outer wheel will move upwardly while the suspension arms associated with the inside wheel will move downwardly. These movements of the wheel either by reason of passing over rough pavements or when negotiating a curve undergo certain camber changes as will become more apparent hereinafter.

Referring to Fig. 2, it will be observed that the upper and lower wishbone arms 8 and 10 incline upwardly and outwardly from their pivotal supports 12 and 14, respectively, the upper arm 8 inclining at a greater angle than the lower arm. The inclination of arms 8 and 10 is such that extensions of their longitudinal axes measured between the pivotal mountings 12, 26 and 14, 28, respectively, will converge on a point 73 on the pavement 24, a distance of approximately ten feet from the point of contact 74 of the center of the tire with the pavement at a normal five-passenger vehicle load. The distance between the point of convergence of the arms 8 and 10 and the point 74 is known as the instantaneous swing arm which, of course, varies when the wheel moves from a normal position in either compression or rebound. While the lengths and angles of inclination of arms 8 and 10 might be varied somewhat, it has been found that the best results are obtained in controlling camber and handling of the vehicle by using an upper control arm 8 of a length approximately two-thirds the length of lower arm 12, and by sloping the upper arm at an angle with the horizontal somewhat more than twice the angle of inclination of the lower arm, at a normal predetermined vehicle load. The distance between the axes of the pivotal supports 26 and 28 or the effective length of knuckle support 30 is approximately ten inches. The inward inclination of the king pin 34, as pointed out before is approximately five degrees with a vertical plane. By proportioning and sloping the arms 8 and 10 in this manner, they will converge on a point 73 on the pavement substantially ten feet from the center of wheel contact with the pavement 74 when the vehicle is subjected to a normal five-passenger load. The center line 16 of the vehicle, it will be seen, will intersect the line between points 73 and 74 at a point indicated at 76 on the surface of the pavement. The instantaneous roll center of the vehicle at a normal five-passenger load, accordingly, lies on the pavement thereby assuring proper handling of the vehicle.

The camber changes of both the inside and outside wheels employing a suspension of the type just described, which operate to modify the roll camber of the vehicle is shown in Fig. 5. The numeral 80 represents the position of the parts at a normal predetermined vehicle load. The eight curves 82 represent camber changes of the inside wheel for each five degree change in the steering angle from substantially zero degrees representing straight ahead movement of the wheels, to a steering angle of substantially 40 degrees, while the curves 84 similarly represent the camber changes for the outside wheel. It will be observed that the camber changes in both the inside and outside wheels when moving in a straight ahead direction or when the steering angle is substantially zero are substantially identical, the camber angle at the point of zero compression and rebound being positive and equal to a small fraction of one degree. As the wheels move in compression the camber of both the inside and outside wheels sharply increases until the maximum compression is reached which corresponds to an upward movement of the pivotal support 28 of the lower control arm 10 of approximately four inches. At this point the suspension has produced a negative camber of approximately 3.5 degrees. On the other hand when the inside and outside wheels move in rebound the suspension produces a positive camber which gradually increases in value and at the maximum rebound which corresponds to a movement of the pivotal support 28 of the lower control arm 10 of approximately four inches, it equals substantially 35 minutes. The curves extending outwardly from the inner curve indicate the corresponding positions of the inside and outside wheels for each five degree change in the steering angle of the wheels, the outermost curve for each of the wheels being produced when the steering angle is substantially 40 degrees. It will be observed from these curves that the suspension produces progressive increases in positive camber and corresponding decreases in negative camber as the steering angle increases in value. When the outside wheel is in maximum compression with a steering angle of substantially 40 degrees the negative camber is approximately 1.5 degrees as compared with approximately 3.5 degrees when the steering angle is zero degrees. When the outside wheel reaches its limit of movement in rebound and the steering angle is 40 degrees the positive camber angle thereof is substantially one degree and 20 minutes. For the inside wheel when steering angle is substantially 40 degrees the negative camber thereof at maximum compression is substantially one degree and 48 minutes and at maximum rebound the positive camber is approximately one degree and 52 minutes.

The reason for the variation in camber from a zero steering angle to an angle of substantially 40 degrees is due principally to the effect of the king pin 34 which, it will be observed, is disposed at approximately a five degree angle with the vertical. The king pin has been so inclined in order to compensate for the changes in roll camber caused by changes in the steering angle when negotiating a curve. By so modifying the roll camber of both wheels it will be seen that there will be less slippage angle to the tires, less tire wear, less tire squeal, and better handling and steering of the vehicle.

As pointed out before, it is desirable that the tread variation be reduced to a minimum to prevent undue wear and tire squeal under operating conditions. This is accomplished by proportioning the lengths of the upper and lower control arms and the angles of inclinations thereof, as previously described. Referring to Fig. 6, the numeral 88 designates a curve showing tread variations in fractions of an inch between maximum compression and maximum rebound. During compression the wheel moves inwardly slightly from a zero starting position to slightly more than two-tenths of an inch at maximum compression. The same is true in rebound, the wheel moving inwardly slightly from the zero starting position to slightly less than two-tenths of an inch at maximum rebound. From this it will be appreciated that the tread variation between maximum compression and maximum rebound of a wheel is practically negligible and that during a substantial movement of a wheel between these two extreme positions there is substantially no tread variation whatever.

From the foregoing description it is seen that a novel and highly efficient wheel suspension has been provided which effectively modifies the roll camber of both the inside and outside wheels in such a manner that less slippage angle and tire squeal results together with better handling and steering of the vehicle. The suspension also is so constructed that negligible tread variation occurs during movement of the wheels in both compression and rebound thereby reducing tire wear to a minimum. The parts of the suspension also are so disposed as to produce a trailing effect which operates to improve ride qualities of the vehicle, particularly over rough roads.

While but one embodiment has been shown and described herein, it is apparent that the invention is subject to modification and change without departing from the spirit thereof. It therefore is to be understood that it is not intended to limit the invention to the single embodiment shown but only by the scope of the claims which follow.

What is claimed is:

1. In a vehicle having a frame and spaced dirigible road wheels, an independent suspension for each of said wheels adapted to modify roll camber, each suspension comprising a wheel supporting member, spaced upper and lower control arms pivotally supported at one of their ends on said frame, means pivotally connecting said upper and lower arms at their opposite ends to the opposite ends of said wheel supporting member, resilient means disposed between said frame and said suspension, each of said control arms being inclined upwardly from the horizontal, the upper arm being inclined more than the lower arm so that at predetermined normal load on said vehicle the extensions of the longitudinal axes of the respective arms converge on the supporting surface for the wheel associated with said suspension at a point spaced from said wheel approximately twice the tread width of said dirigible wheels, the lengths of said arms being so proportioned that vertical movement of said wheel relative to said frame occurs with a minimum of tread width variation.

2. The structure substantially as set forth in claim 1 wherein said upper arm is approximately two-thirds the length of said lower arm.

3. The structure substantially as set forth in claim 1 wherein the angle of inclination of said upper arm is more than twice the angle of inclination of said lower arm.

4. The structure substantially as set forth in claim 1 wherein said control arms incline rearwardly from their pivotal supports on said supporting means thereby producing a trailing effect on said wheel whereby to minimize jarring of the parts as the said wheel rolls over rough roadways.

5. The structure substantially as set forth in claim 1 wherein upon upward movement of said wheel relative to said supporting means said suspension causes tilting of said wheel inwardly toward said supporting means, and upon downward movement of said wheel relative to said supporting means said suspension causes tilting of said wheel away from said supporting means.

References Cited in the file of this patent

UNITED STATES PATENTS

| | | |
|---|---|---|
| 2,092,612 | Olley | Sept. 7, 1937 |
| 2,123,087 | Leighton | July 5, 1938 |
| 2,321,832 | Leighton | June 15, 1943 |
| 2,596,922 | Thoms | May 13, 1952 |